US010634773B2

(12) United States Patent
Jachmann et al.

(10) Patent No.: US 10,634,773 B2
(45) Date of Patent: Apr. 28, 2020

(54) MONITORING SENSOR AND FLOOR-BOUND VEHICLE (71) Applicant: SICK AG, Waldkirch/Breisgau (DE)

(72) Inventors: Fabian Jachmann, Freiburg (DE); Michael Engler, Sexau (DE)

(73) Assignee: SICK AG, Waldkirch/Breisgau (DE)

( * ) Notice: Subject to any disclaimer, the term of this patent is extended or adjusted under 35 U.S.C. 154(b) by 105 days.

(21) Appl. No.: 15/866,835

(22) Filed: Jan. 10, 2018

(65) Prior Publication Data
US 2018/0196128 A1 Jul. 12, 2018

(30) Foreign Application Priority Data

Jan. 11, 2017 (EP) ..................... 17150936

(51) Int. Cl.
*G02B 26/08* (2006.01)
*G01S 7/497* (2006.01)
(Continued)

(52) U.S. Cl.
CPC ........... *G01S 7/4972* (2013.01); *G01S 7/4811* (2013.01); *G01S 7/4814* (2013.01); *G01S 7/4817* (2013.01); *G01S 7/4865* (2013.01); *G01S 17/026* (2013.01); *G01S 17/48* (2013.01); *G01S 17/895* (2013.01); *G01S 17/936* (2013.01); *G08G 1/16* (2013.01)

(58) Field of Classification Search
CPC .... G01S 7/4972; G01S 7/4811; G01S 7/4814; G01S 7/4817; G01S 7/4865; G01S 7/026; G01S 7/48; G01S 7/895; G01S 7/936; G08G 1/16; G02B 26/123; G02B 26/08; G02B 26/0808; G02B 26/0816;
(Continued)

(56) References Cited

U.S. PATENT DOCUMENTS 6,204,916 B1 * 3/2001 Norita ................. G01C 15/002
250/206.2
6,381,057 B1 * 4/2002 Itabashi ................. B41J 2/473
347/243
(Continued)

FOREIGN PATENT DOCUMENTS

DE 102004047022 A1 4/2006
EP 1947477 A1 7/2008
JP 2001 004746 A 1/2001

OTHER PUBLICATIONS

European search report dated Jul. 25, 2017 for corresponding application No. EP 17150936.

*Primary Examiner* — Richard A Goldman
(74) *Attorney, Agent, or Firm* — Nath, Goldberg & Meyer; Jerald L. Meyer (57) ABSTRACT The present invention relates to a monitoring sensor for the spatially resolved detection of objects in a monitored zone in accordance with the principle of triangulation, comprising
a light transmitter for transmitting transmitted light into the monitored zone, wherein the light transmitter comprises a light source and a transmission optics that has an optical axis;
a light receiver that has a plurality of receiver elements for receiving light from the monitored zone that is remitted by an object to be detected; and
a reception optics arranged upstream of the light receiver.
The invention further relates to a floor-bound vehicle having a monitoring sensor.

12 Claims, 3 Drawing Sheets

(51) Int. Cl.
  *G08G 1/16* (2006.01)
  *G01S 17/89* (2020.01)
  *G01S 17/02* (2020.01)
  *G01S 17/48* (2006.01)
  *G01S 7/4865* (2020.01)
  *G01S 17/93* (2020.01)
  *G01S 7/481* (2006.01)

(58) Field of Classification Search
  CPC .. G02B 26/0875; G02B 26/10; G02B 26/101; G02B 26/106; G02B 26/108
  USPC ............ 701/301, 28; 356/4.01, 141.1, 141.4, 356/141.5, 218, 369
  See application file for complete search history.

(56) References Cited

U.S. PATENT DOCUMENTS

| | | | |
|---|---|---|---|
| 2007/0181786 A1* | 8/2007 | Doemens | G01S 7/4814 250/221 |
| 2011/0153139 A1* | 6/2011 | Erb | G01S 7/4812 701/28 |
| 2011/0199454 A1* | 8/2011 | Ichii | B41J 2/465 347/224 |
| 2012/0212727 A1* | 8/2012 | Hammes | G01S 7/4814 356/5.01 |
| 2012/0218564 A1* | 8/2012 | Wustefeld | G01S 7/497 356/614 |
| 2013/0077083 A1* | 3/2013 | Suzuki | G01S 7/4817 356/4.01 |
| 2014/0111805 A1* | 4/2014 | Albert | G01V 8/10 356/369 |
| 2014/0114526 A1* | 4/2014 | Erb | G05D 1/024 701/28 |
| 2014/0166866 A1* | 6/2014 | Gehring | G01S 17/42 250/234 |
| 2015/0204977 A1* | 7/2015 | Sakai | G01S 17/42 356/4.01 |
| 2015/0219763 A1* | 8/2015 | Nubling | G01S 17/42 250/221 |
| 2016/0109616 A1* | 4/2016 | Hammes | G01S 17/10 356/614 |
| 2016/0150968 A1* | 6/2016 | Imai | A61B 5/0095 600/407 |
| 2017/0168144 A1* | 6/2017 | Gimpel | G01S 7/4816 |
| 2017/0242099 A1* | 8/2017 | Yamazaki | G01S 7/4808 |
| 2017/0242111 A1* | 8/2017 | Tagashira | G01S 7/4817 |
| 2017/0261603 A1* | 9/2017 | Jachmann | G01N 15/0205 |
| 2018/0196128 A1* | 7/2018 | Jachmann | G01S 17/936 |

* cited by examiner

MONITORING SENSOR AND FLOOR-BOUND VEHICLE

FIELD

The present invention relates to a monitoring sensor for the spatially resolved detection of objects in a monitored zone in accordance with the principle of triangulation.

BACKGROUND

With floor-bound vehicles, in particular automated guided vehicles, there is an increasing need to monitor the route of the vehicle for the presence of obstacles by means of suitable sensors. Laser scanners are frequently used for this purpose. Such laser scanners as a rule have movable optics and apparatus for measuring the time of flight, which is associated with high costs.

An alternative to the use of laser scanners comprises the use of monitoring sensors in accordance with the initially named kind working in accordance with the principle of laser triangulation.

The distance of an object or obstacle present in the monitored zone can be determined with the aid of such a monitoring sensor. The light generated by the light source of the light transmitter is focused with the aid of the transmission optics to form a transmitted light beam that is incident in the monitored zone on an object to be detected that may be located there. The transmitted light can be remitted, i.e. diffusely or specularly reflected, by such an object. It passes through a reception optics and can be detected by a light receiver that forms a reception unit together with the reception optics. The light receiver comprises an array of photosensitive receiver elements in known solutions.

The position of a light spot generated by the remitted light on the light receiver in the so-called direction of triangulation changes in dependence on the distance between the monitoring sensor and the remitting object. There is a clear geometrical relationship between the point of incidence on the light receiver and the distance of the detected object. The distance between the object and the monitoring sensor can thus be determined by evaluating the light distribution on the light receiver.

A monitoring sensor can be mounted at a vehicle for monitoring the route, with the monitoring sensor expediently being arranged spaced apart from the route to be monitored and being aligned such that the transmitted light is emitted obliquely at a predefined angle of inclination in the direction of the route and is incident there at a corresponding spacing from the monitored sensor. The route thus represents a scanning plane. The monitored zone extends between the monitoring sensor and the place of incidence of the transmitted light on the scanning plane.

If the transmitted light is incident on an object in the monitored zone that is located closer to the monitoring sensor than the place of incidence of the transmitted light on the scanning plane, the transmitted light that passes through the reception optics is remitted at a different angle in the direction of the reception optics so that the position of the light spot generated from the remitted light is displaced in the direction of triangulation on the light receiver.

So that not only objects can be detected that are located directly in the line of sight of the monitoring sensor, i.e. on or close to the optical axis of the transmission optics, the transmitted light can be laterally widened so that it generates a scanning light line that extends transversely to the line of sight of the monitoring sensor and thus as a rule transversely to the direction of locomotion of the vehicle and in parallel with the scanning plane on the incidence on the scanning plane or generally on an imaginary projection surface.

The transmitted light is so-to-say widened in fan shape so that the monitored zone extends in sector form from the monitoring sensor. The light transmitter, the light receiver, and the reception optics are usually adapted and aligned such that the scanning light line extends as a straight line on the scanning plane transversely to the main monitoring direction of the monitoring sensor, said straight line being imaged as a straight-line light spot on the light receiver in the absence of obstacles, with said straight-line imaging extending in parallel with the rows or columns of the light receiver in which the receiver elements are arranged.

A lateral position on the light receiver, i.e. position in the direction of extent of the linearly imaged light spot here corresponds to a respective angular position within the sector-shaped monitored zone.

If an object is located within the monitored zone that is detected by the transmitted light, the place of incidence of the light received from the corresponding angle is displaced transversely, in particular perpendicular, to the direction of extent of the light spot on the light receiver. In other words, a short segment of the linear received light spot whose length depends on the angular range over which the detected object extends is displaced transversely to the direction of extent of that straight-line received light spot that would be generated without the presence of objects in the monitored zone.

Objects that are located outside a main direction of monitoring extending in the direction of the optical axis of the transmission optics can, however, not be detected sufficiently reliably and early enough by such a monitoring sensor. The main monitoring direction coincides as a rule with the direction of locomotion of a vehicle carrying the monitoring sensor.

There is a need also to detect such external vehicles or other obstacles that move transversely to this direction of locomotion and that could intersect the route of the vehicle with a risk of collision.

SUMMARY

It is therefore the object of the present invention to provide a monitoring sensor that also ensures a reliable object recognition in lateral marginal regions of the monitored zone. A corresponding vehicle having an improved monitoring sensor should furthermore be provided.

The object is satisfied by a monitoring sensor for the spatially resolved detection of objects in a monitored zone in accordance with the principle of triangulation and by a vehicle having such a sensor. The monitoring sensor comprises a light transmitter for transmitting transmitted light into the monitored zone, a light receiver, and reception optics arranged upstream of the light receiver. The light transmitter comprises a light source and a transmission optics that has an optical axis. The light receiver has a plurality of receiver elements for receiving light from the monitored zone that is remitted by an object to be detected. The light transmitter, the light receiver, and the reception optics are arranged with respect to one another such that the position of a light spot in a direction of triangulation results in dependence on the distance of the object, with the light spot being generated on the light receiver from the remitted light by means of the reception optics. The transmission optics is configured to focus the light emitted by the light source to form a transmitted bundle of light rays that, on an incidence on a scanning plane, generate a scanning light line, with the scanning light line extending in a concavely curved manner viewed from the direction of the monitoring sensor, and with the scanning plane extending along a predefined angle of inclination in the direction of triangulation with respect to the optical axis of the transmission optics.

The disclosed technology relates to a monitoring sensor for the spatially resolved detection of objects in a monitored zone in accordance with the principle of triangulation, comprising
  a light transmitter for transmitting transmitted light into the monitored zone, wherein the light transmitter comprises a light source and a transmission optics that has an optical axis;
  a light receiver that has a plurality of receiver elements for receiving light from the monitored zone that is remitted by an object to be detected; and
  reception optics arranged upstream of the light receiver, wherein the light transmitter, the light receiver, and the reception optics are arranged with respect to one another such that the position of a light spot in a direction of triangulation results in dependence on the distance of the object, with the light spot being generated on the light receiver from the remitted light by means of the reception optics. The disclosure further relates to a floor-bound vehicle having such a monitoring sensor.

Provision is made in the monitoring sensor in accordance with the invention that the transmission optics is configured to focus the light emitted by the light source to form a transmitted light bundle of rays that, on incidence onto a scanning plane that extends inclined by a predefined angle of inclination with respect to the optical axis of the transmission optics in the direction of triangulation generates a scanning light line that extends curved concavely viewed from the direction of the monitoring sensor.

The receiver elements are advantageously arranged in the form of a two-dimensional array and are configured to convert received light into electrical received signals. An evaluation unit can be provided to generate a detection signal from the received signals. The light receiver and the light transmitter can be spaced apart from one another in the direction of triangulation in accordance with the principle of triangulation so that the optical paths of the transmitted light and of the received light have a parallax with respect to one another.

Said scanning plane can be considered a virtual reference plane. In practice, the scanning plane can, for example, also correspond to a real surface, e.g. to a route to be monitored, that does not necessarily have to be exactly planar due to local circumstances. Said angle of inclination as a rule depends on the spacing of the monitoring sensor from the scanning plane, i.e. on the height of the fastening point of the monitoring sensor at the vehicle above the route of the vehicle and on the desired maximum extent of the monitored zone in accordance with the spacing of the scanning light line from the monitoring sensor.

The monitoring sensor is designed and/or aligned such that the direction of triangulation extends transversely, advantageously perpendicular, to the scanning plane. An inclination of the direction of triangulation with respect to the scanning plane differing from a perpendicular of the scanning plane is advantageously only provided within a plane that extends perpendicular to the scanning plane and includes the optical axis of the transmission optics.

The desired curvature of the scanning light line is advantageously achieved in that the transmission optics directs off-axis beams more strongly downwardly in the direction of the scanning plane with an increasing lateral angular spacing from the optical axis of the transmission optics.

Lateral part regions of the monitored zone, i.e. part regions that are located to the side of the main monitoring direction, can be monitored better by the monitoring sensor in accordance with the invention. A monitoring of these lateral regions would admittedly also be potentially possible in that a sufficiently large straight-line scanning light line is generated such that a suitable spatial angular range is covered. There would then, however, be the problem that as the angles increase the place of incidence of the transmitted light on the scanning plan is further and further remote from the monitoring sensor and the transmitted light is thus incident on the scanning plane at an ever shallower angle. As a result, a sufficient amount of light is no longer remitted in the direction of the light receiver from these locations so that a reliable detection of remitted light by the light receiver is no longer ensured in these outer regions.

This problem is avoided by the present invention since the places of incidence of the transmitted light on the scanning plane are close to the monitoring sensor in outer angular regions of the monitored zone than would be the case with a scanning light line extending in a straight-line due to the concave curvature of the scanning light line.

In accordance with an advantageous embodiment of the invention, the extent of the scanning light line on the scanning plane corresponds to a segment of a circle, of a parabola, of a hyperbola, or of an ellipse.

These extents have proved to be suitable to achieve the desired improvement in the scanning security. The advantage additionally results from the design of the scanning light line as a circular segment that the spacing of the scanning light line and thus the extent of the monitored zone remains the same over the total angular range of the scanned sector. The aperture angle of the scanned sector-shaped region, i.e. the angular region over which the monitored zone extends, advantageously amounts to at least 45°, preferably at least 90°, and in particular up to 180°.

The transmitted light bundle of rays focused by the transmission optics advantageously produces a curved reference light line in projection onto a reference scanning plane extending perpendicular to the optical axis of the transmission optics. The extent of the reference light line can serve as a reference for the design of the transmission optics or reception optics such that in particular the computation steps required on a calculation of the optics can be simplified. The vertex of the reference light line advantageously corresponds to the point of intersection of the optical axis of the transmission optics with the reference scanning plane.

In accordance with a further advantageous embodiment of the invention, the intensity distribution of the scanning light line is homogeneous in the longitudinal direction and/or in the transverse direction of the scanning light line. It is ensured by a corresponding configuration of the transmission optics that, on the one hand, the imaging of the scanning light line on the light receiver, i.e. the light spot, is delineated as sharply as possible and, on the other hand, an intensity distribution of the light spot is present that is as homogeneous as possible over its total length. A reliable object detection over the total monitored zone is thereby made possible.

The reception optics is advantageously adapted to generate an image of the scanning light line on the light receiver corresponding to a straight line. It is assumed as a model for such a straight-line image of the scanning light line on the light receiver that the transmitted light is incident on a planar scanning plane so that no distortion occurs with the curvature shape of the scanning light line. The reception optics so-to-say "reverses" the distortion of the transmission optics that is required, for instance, to transform an imaginary scanning light line extending in a straight line into the concavely curved scanning light line in accordance with the invention.

On a use of a reception optics that would not take account of this distortion, a light spot would arise on the light receiver that likewise extends in a curved manner, which would make the evaluation of an image generated by the light receiver more complex since then a maximum of the light receiver could e.g. no longer be determined row-wise or column-wise, but rather radial components would have to be taken into account in the distance determination. In addition, the light-sensitive surface of the light receiver is ideally exploited. The generation of a light spot in the form of a straight-line image of the scanning light line furthermore provides the advantage that the variation of the light spot position on the light receiver remains largely the same in dependence on the spacing of an object to be detected from the monitoring sensor independently of the angular position of the object.

The receiver elements of the light receiver are advantageously arranged in rows and columns, with the image of the scanning light line on the light receiver extending in parallel with the rows or columns. The evaluation of the image generated by the light receiver is hereby again facilitated.

It has proved to be advantageous for the transmission optics and/or the reception optics to each comprise at least one lens, with at least one light-refracting surface of the lens being formed as a free-form surface. The desired distortion on the generation of the scanning light line or on the generation of an image of the scanning light line on the light receiver can be achieved in a simple and inexpensive manner by the design of at least one light-refracting surface as a free-form surface. It is generally also possible that the transmission and/or reception optics is/are formed as a mirror optics or comprise/comprises a respective combination of one or more mirror optics and one or more lenses. The transmission optics and/or the reception optics can advantageously respectively comprise at least one mirror optics whose light-reflective surface is designed as a free-form surface.

The transmission optics advantageously has at least two free-form surfaces, with a first free-form surface being configured such that it would per se generate a scanning light line extending straight on the scanning plane and with a second free-form surface being configured such that it generates the curvature of the scanning light line. The first free-form surface therefore effects a collimation of the transmitted light in the direction of triangulation and a spread of the transmitted light in the direction of the aperture angle. The second free-form surface serves to deflect off-axis beams more strongly downwardly in the direction of the scanning plane with an increasing lateral angular spacing from the optical axis to generate the desired curvature of the scanning light line. The free-form surfaces can, for example, be provided at one lens or alternatively at a plurality of lenses. The two light-refracting surfaces of a single lens can in particular be formed as respective free-form surfaces.

The present invention also covers a floor-bound vehicle, in particular an automated guided vehicle, having a monitoring sensor in accordance with at least one of the above-named embodiments for monitoring a route of the vehicle.

The monitoring sensor is advantageously arranged at the vehicle spaced apart from the route to the be monitored and is aligned such that the optical axis of the transmission optics intersects a planar route at a predefined spacing from the vehicle.

Further advantageous embodiments of the invention result from the description, from the drawings and from the dependent claims.

BRIEF DESCRIPTION OF THE DRAWINGS

The invention will be described in the following with reference to an embodiment and to the drawings. There are shown.

DETAILED DESCRIPTION

Figure 1:
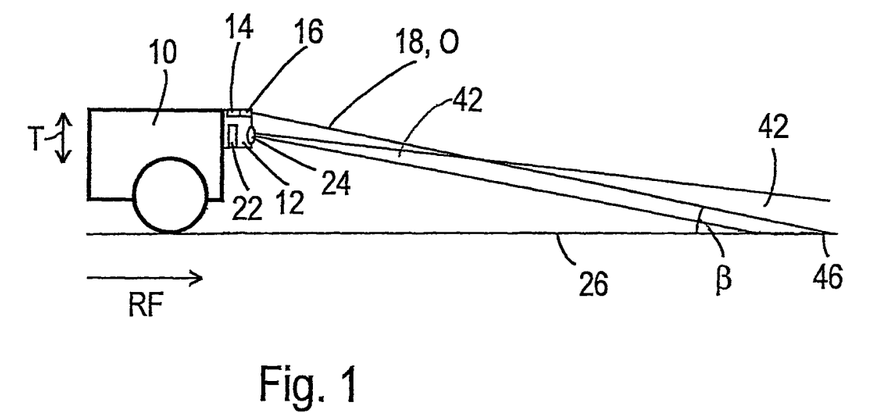
FIG. 1 a vehicle with a monitoring sensor in accordance with an embodiment of the invention of the present invention in a side view.
Figure 2:
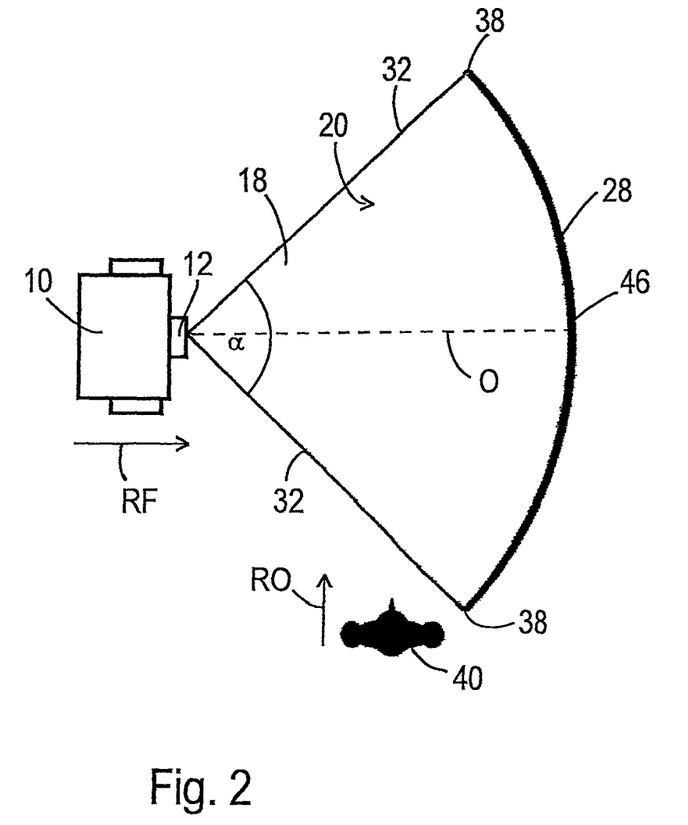
FIG. 2 the vehicle and the monitoring sensor of FIG. 1 in a plan view.

FIGS. 1 and 2 show a floor-bound vehicle 10 that can move along a route 26 in a direction of movement RF. A monitoring sensor 12 for the spatially resolved detection of objects in a monitored zone 20 is arranged at the vehicle 10 spaced apart from the route 26.

The monitoring sensor 12 has a light transmitter for transmitting transmitted light into the monitored zone 20, with the light transmitter having a light source 14 and a transmission optics 16 that has an optical axis O. The monitoring sensor 12 furthermore comprises a light receiver 22 that has a plurality of receiver elements that are arranged in array form in rows and columns. A reception optics 24 is arranged upstream of the light receiver 22 and focuses light from the monitored zone 20 that is remitted by an object 40 to be detected or by the route 26 in the direction toward the light receiver 22.

The light source 14, the transmission optics 16, the light receiver 22 and the reception optics 24 are arranged and aligned with respect to one another such that the position of a light spot generated on the light receiver 22 by means of the reception optics 24 is produced in a direction of triangulation T in dependence on the distance of the object 40, with light that is remitted from a reception region 42 being able to be detected.

The optical path is only shown in a sectional view for reasons of clarity in the side view of FIG. 1, with the sectional plane extending along the optical axis O.

The monitoring sensor 12 is inclined with respect to the route 26 so that a light beam transmitted along the optical axis O is incident on the route at an angle of inclination 13 at a point of incidence 46 spaced apart from the vehicle 10.

The transmission optics 16 is configured to collimate the transmitted light 18 in the direction of triangulation T or transversely to a plane that is defined by the route 26 and that is also called a scanning plane 26 in the following and to widen or spread said transmitted light in a direction orthogonal hereto in the direction of an aperture angle ((FIG. 2). The transmitted light bundle of rays 18 thus extends in a fan-like manner into the monitored zone 20. Due to the collimation, on the one hand, and the fan-like widening, on the other hand, the transmitted light 18 is shaped by means of the transmission optics 16 such that it generates a scanning light line 28 on the scanning plane 26 in the absence of objects or other obstacles in the optical path, said scanning light line extending in a concavely curved manner viewed from the direction of the monitoring sensor 12 (see FIG. 2). The design and function of the transmission optics 16 will be described in even more detail in the following.

The curvature of the scanning light line 28 corresponds in the embodiment in accordance with FIG. 2 to a circle segment, with the aperture angle ⟨ approximately amounting to 90°.

In accordance with a modification, the scanning light line 28 can also correspond to a segment of a hyperbola, a parabola, or an ellipse.

The reception optics 24 is configured to image the scanning light line 28 on the light receiver 22 such that a light spot corresponding to a straight line is generated on the light receiver 22, with this straight-line light spot extending in parallel with the scanning plane 26 and perpendicular to the direction of triangulation T in parallel with the rows or columns of the light receiver 22. The design and function of the reception optics 24 will be described in even more detail in the following.

If an object 40, for example an external vehicle, an obstacle, or a person, moves into the monitored zone 20 and is detected by the transmitted light bundle of rays 18, a part region of the transmitted light bundle of rays 18 corresponding to the extent of the object 40 is remitted by the object 40 in the direction toward the reception optics 24, with the angle of triangulation at which the remitted light is incident on the reception optics 24 and on the light receiver 22 changing in dependence on the spacing of the object 40. The place of incidence of the received light changes accordingly in the direction of triangulation for a corresponding section of the received light spot.

The spacing of a detected object 40 can thus be determined from the variation of the place of incidence on the light receiver 22 in the direction of triangulation T, while the angular position of the object can be determined from the position of the place of incidence on the light receiver 22 in a direction transverse to the direction of triangulation T.

The concave curvature of the scanning light line 28 in this respect improves the detection of objects in lateral regions of the monitored zone 20. An object 40 whose direction of movement RO extends transversely to the direction of movement RF of the vehicle in accordance with FIG. 2 can thus, for example, already be detected at an early point in time so that a possible collision with the vehicle 10 can be avoided.

Figure 3:
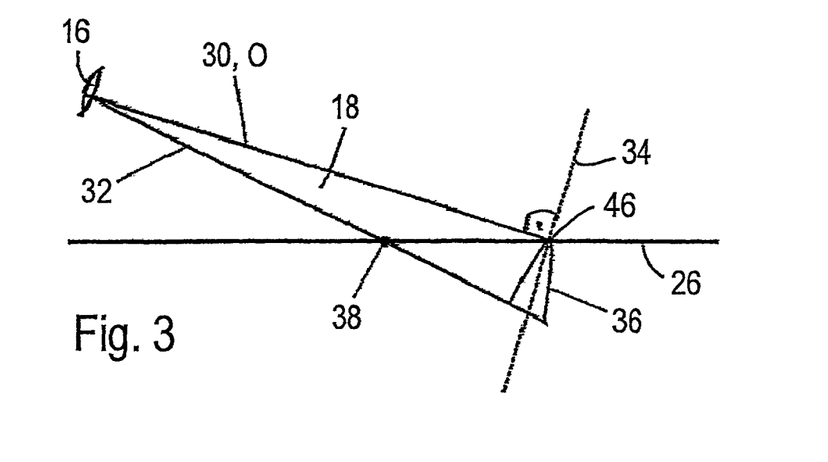
FIG. 3 a schematic transmitted light optical path.

The design of the transmission optics 16 will be described in more detail in the following with reference to FIGS. 3 to 5. FIG. 3 schematically shows a transmitted light optical path in a side view, wherein, unlike in FIG. 1, not only a center transmitted light beam 30 of the transmitted light bundle of rays 18 extending along the optical axis O of the transmission optics 16 is shown, but also additionally the two outer transmitted light beams 32 that are behind one another in the perspective of FIG. 3 and are to this extent not visible separately from one another in the representation. As can easily be recognized in FIG. 3, the outer transmitted light beams 32 are incident on the scanning plane 26 at a greater angle than the center transmitted light beam 30. The outer transmitted light beams 32 are incident on the scanning plane 26 or intersect it at passage points 38, while the center transmitted light beam 30 is incident on the scanning plane 26 at the point of incidence 46.

The calculation of the transmission optics 16 can take place, for example, on the basis of a reference light line 36 that is generated as an image or projection of the transmitted light bundle of rays 18 after passing through the scanning plane 26 assumed as transparent here on a reference scanning plane 34 that extends perpendicular to the center transmitted light beam 30 or to the optical axis O. In the representation of FIG. 3, the reference light line 36 thus created is rotated in the plane of the drawing. The reference light line 36 has a hyperbola-like or parabola-like extent, with the vertex being at the point of incidence 46.

Figure 4:
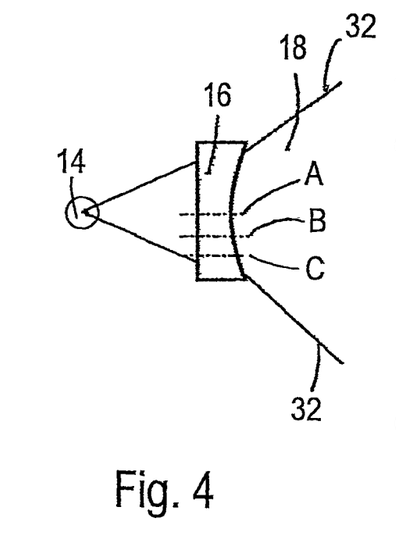
FIG. 4 a transmission optics of the monitoring sensor of FIGS. 1 and 2 in a plan view.
Figure 5:
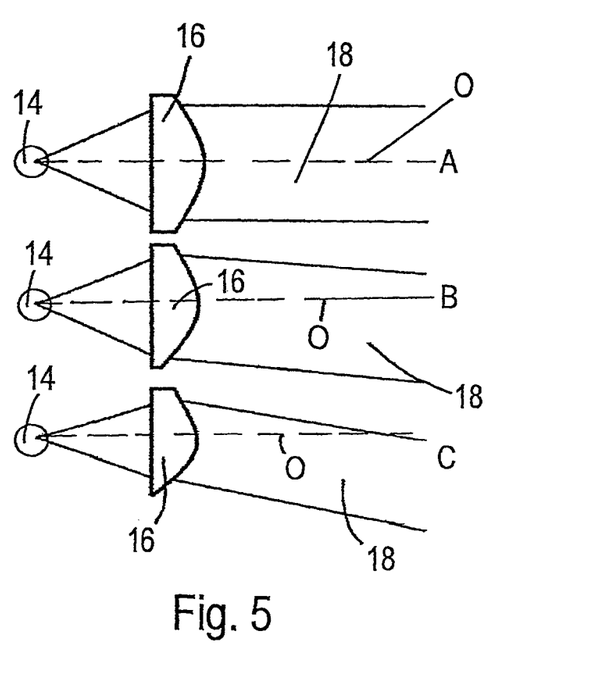
FIG. 5 different part optical paths of the transmitted light in a sectional representation.

An exemplary transmission optics 16 is shown in FIGS. 4 and 5 by which the described transmitted light optical path can be generated. The transmission optics 16 is here formed by way of example as a biconical lens, with the one light-refracting surface of the lens being planar and the other light-refracting surface being curved concavely curved in a plan view in accordance with FIGS. 2 and 4 and being convexly curved in a side view in accordance with FIGS. 1 and 5.

The concave curvature of the light-refracting surface effects, in accordance with FIG. 4, the fan-like spreading of the transmitted light bundle of rays 18, while the convex curvature portion in accordance with FIG. 5 effects the collimation of the transmitted light bundle of rays in the direction of triangulation T and the angle-dependent change of the irradiation angle.

Three mutually spaced apart sectional planes A to C are drawn in FIG. 4. Sectional plane A extends at the center of the transmission optics 16, sectional plane C in an outer region, and sectional plane B between sectional planes A and C. The associated sectional representations are shown in FIG. 5. It can be easily recognized here that a largely parallel collimation of the transmitted light beam of rays 18 takes place in all three sectional planes A to C. While the bundle of rays 18 extends in parallel with the optical axis O in sectional plane A, the inclination of the beam of rays 18 increases outwardly with respect to the optical axis O.

The effective light-refracting surface of the transmission optics 16 can preferably be designed as a free-form surface, with its calculation being able to take place on the basis of the reference light line 36 (FIG. 3).

In general, the different optical functions of the transmission optics 16 do not have to be implemented in a single light-refracting surface, but can rather also be distributed over different light-refracting surfaces of a single lens or of a plurality of lenses.

To achieve a straight-line imaging of the scanning light line 28 on the light receiver 22, the reception optics 24 can be designed in a corresponding manner, with the angle-dependent distortion that generates the curvature of the scanning light line 28 substantially being able to be "reversed" again. A property corresponding to the divergent component of the transmission optics 16, such as is provided in the transmission optics 16 for the fan-like spreading of the bundle of rays, can be omitted in the reception optics 24 as a rule.

Figure 6:
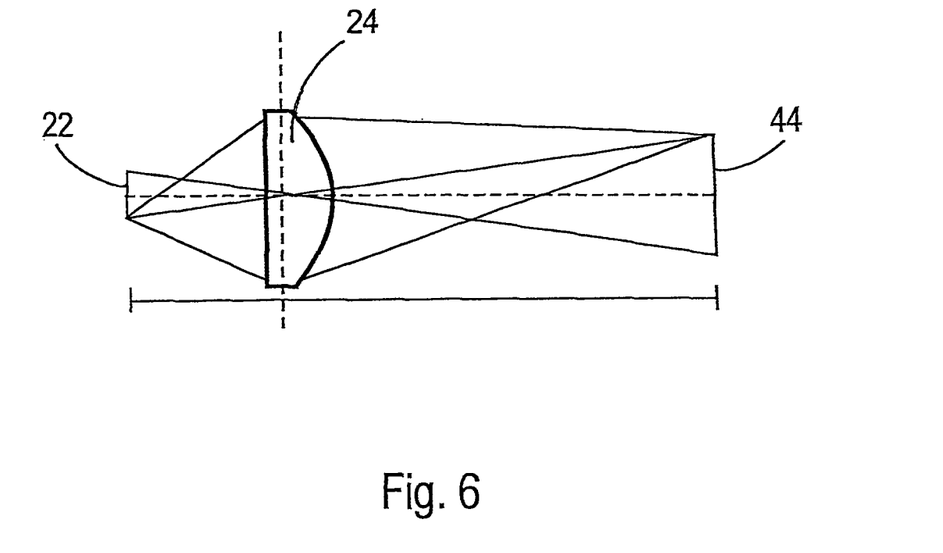
FIG. 6 a reception optics of the light receiver of FIGS. 1 and 2.

An exemplary reception optics 24 is shown schematically in FIG. 6. The reception optics 24 is designed with respect to its focal length and to its aperture angle such that an imaging region 44 corresponding to the extent of the scanning light line 28 is imaged on the light receiver 22 over almost the complete area. It is thereby avoided that unwanted scattered light reaches the light receiver 22. The passage points 38 of the outer transmitted light beams 23 (FIGS. 2 and 3) should accordingly be imaged in regions of the light receiver 22 as close to the margin as possible. It is ultimately thereby ensured that transmitted light 18 that is remitted in the direction of the monitoring sensor 12 at different positions in the monitored zone 20 is focused on the light receiver 22 with a brightness that is as uniform as possible so that the monitoring sensor 12 has a sensitivity that is as independent of the position as possible. One or more light-refracting surfaces of the transmission optics 16 can likewise be designed as free-form surfaces.

REFERENCE NUMERAL LIST 10 vehicle
12 monitoring sensor
14 light source
16 transmission optics
18 transmitted light, transmitted light bundle of rays
20 monitored zone
22 light receiver
24 reception optics
26 route, scanning plane
28 scanning light line
30 center transmitted light beam
32 outer transmitted light beam
34 reference scanning plane
36 reference light line
38 passage point
40 object
42 received light region
44 imaging region
46 point of incidence
A to C sectional plane
O optical axis
RF direction of movement of the vehicle
RO direction of movement of the object
T direction of triangulation
⟨ aperture angle
® angle of inclination

The invention claimed is:

1. A monitoring sensor for the spatially resolved detection of objects in a monitored zone in accordance with the principle of triangulation, the monitoring sensor comprising
a light transmitter for transmitting transmitted light into the monitored zone, wherein the light transmitter comprises a light source and a transmission optics that has an optical axis;
a light receiver that has a plurality of receiver elements for receiving light from the monitored zone that is remitted by an object to be detected; and
a reception optics arranged upstream of the light receiver;
wherein the light transmitter, the light receiver, and the reception optics are arranged with respect to one another such that a position of a light spot in a direction of triangulation depends on the distance of the object, with the light spot generated on the light receiver from the remitted light by means of the reception optics; and
wherein the transmission optics is configured to focus the light emitted by the light source to form a transmitted bundle of rays that, on an incidence on a scanning plane, generates a scanning light line, with the scanning light line extending in a concavely curved manner viewed from the direction of the monitoring sensor, and with the scanning plane extending along a predefined angle of inclination in the direction of triangulation with respect to the optical axis of the transmission optics.

2. The monitoring sensor in accordance with claim 1, wherein the extent of the scanning light line on the scanning plane corresponds to a segment of a circle, of a parabola, of a hyperbola, or of an ellipse.

3. The monitoring sensor in accordance with claim 1, wherein the transmitted bundle of light rays focused by the transmission optics generates a curved reference light line in projection onto a reference scanning plane extending perpendicularly to the optical axis of the transmission optics.

4. The monitoring sensor in accordance with claim 1, wherein an intensity profile of the scanning light line is homogeneous in a longitudinal direction.

5. The monitoring sensor in accordance with claim 1, wherein an intensity profile of the scanning light line is homogeneous in a transverse direction of the scanning light line.

6. The monitoring sensor in accordance with claim 1, wherein the reception optics is configured to generate an image of the scanning light line on the light receiver corresponding to a straight line.

7. The monitoring sensor in accordance with claim 6, wherein the receiver elements of the light receiver are arranged in rows and columns; and
wherein the image of the scanning light line on the light receiver extends in parallel with the rows or columns.

8. The monitoring sensor in accordance with claim 1, wherein at least one of the transmission optics and the reception optics comprises at least one lens, with said at least one lens having at least one light-refracting surface formed as a free-form surface.

9. The monitoring sensor in accordance with claim 8, wherein the transmission optics has at least two free-form surfaces, with a first free-form surface configured such that it would per se generate a scanning light line extending straight on the scanning plane and with a second free-form surface configured such that it generates the curvature of the scanning light line.

10. A floor-bound vehicle having a monitoring sensor for monitoring a route of the vehicle, the monitoring sensor comprising
a light transmitter for transmitting transmitted light into the monitored zone, wherein the light transmitter comprises a light source and a transmission optics that has an optical axis;
a light receiver that has a plurality of receiver elements for receiving light from the monitored zone that is remitted by an object to be detected; and
a reception optics arranged upstream of the light receiver;
wherein the light transmitter, the light receiver, and the reception optics are arranged with respect to one another such that a position of a light spot in a direction of triangulation depends on the distance of the object, with the light spot generated on the light receiver from the remitted light by means of the reception optics; and
wherein the transmission optics is configured to focus the light emitted by the light source to form a transmitted bundle of rays that, on an incidence on a scanning plane that extends along a predefined angle of inclination in the direction of triangulation with respect to the optical axis of the transmission optics, generates a scanning light line that extends in a concavely curved manner viewed from the direction of the monitoring sensor.

11. The floor-bound vehicle in accordance with claim 10, wherein the floor bound vehicle is an automated guided vehicle.

12. The floor-bound vehicle in accordance with claim 10, wherein the monitoring sensor is arranged at the vehicle, with the sensor spaced apart from the route to be monitored, and the sensor aligned such that the optical axis of the transmission optics intersects a planar route at a predefined spacing from the vehicle.

\* \* \* \* \*